(12) United States Patent
Chan (10) Patent No.: US 8,429,134 B2
(45) Date of Patent: Apr. 23, 2013

(54) DISTRIBUTED DATABASE RECOVERY

(75) Inventor: Wilson Wai Shun Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 402 days.

(21) Appl. No.: 12/555,500

(22) Filed: Sep. 8, 2009

(65) Prior Publication Data

US 2011/0060724 A1    Mar. 10, 2011

(51) Int. Cl.
*G06F 7/00* (2006.01)
*G06F 17/00* (2006.01)

(52) U.S. Cl.
USPC .......................................... 707/678; 707/685

(58) Field of Classification Search .................. 707/674, 707/685, 678
See application file for complete search history.

(56) References Cited

U.S. PATENT DOCUMENTS

| | | | | |
|---|---|---|---|---|
| 5,781,912 A * | 7/1998 | Demers et al. | ................. | 707/634 |
| 5,903,910 A * | 5/1999 | Tran et al. | ..................... | 711/132 |
| 6,353,836 B1 * | 3/2002 | Bamford et al. | ...................... | 1/1 |
| 6,507,853 B2 * | 1/2003 | Bamford et al. | ............... | 707/674 |
| 6,801,914 B2 * | 10/2004 | Barga et al. | .................... | 707/674 |
| 7,725,655 B2 * | 5/2010 | Frolund et al. | ................. | 711/119 |
| 7,788,224 B2 * | 8/2010 | Fleck et al. | ..................... | 707/623 |
| 8,224,977 B2 * | 7/2012 | Loaiza et al. | .................. | 709/229 |
| 2004/0215640 A1 | 10/2004 | Bamford et al. | | |
| 2005/0022047 A1 * | 1/2005 | Chandrasekaran | ............... | 714/4 |
| 2006/0015542 A1 | 1/2006 | Pommerenk et al. | | |
| 2006/0117074 A1 * | 6/2006 | Ezzat | ........................... | 707/202 |

* cited by examiner

*Primary Examiner* — James Trujillo
*Assistant Examiner* — Pavan Mamillapalli
(74) *Attorney, Agent, or Firm* — Hickman Palermo Truong Becker Bingham Wong LLP; Daniel D. Ledesma (57) ABSTRACT

A method and apparatus for recovery a cluster database is provided. Database recovery is divided among a plurality of surviving database server instances in the cluster. A surviving instance is responsible for recovering data blocks to which the surviving instance is assigned. One form of block-to-instance assignment may be based on mastership of the blocks. If a data block is locked by a surviving instance at the time of failure, then no recovery of that data block may be necessary. Else, if a copy of a data block that is to be recovered is stored on a surviving node in the cluster, then one or more redo records are applied to that copy (if necessary). A redo record that corresponds to that data block might not need to be applied to the copy if the redo record reflects changes (to the data block) that are already reflected in the copy.

20 Claims, 5 Drawing Sheets

FIG. 1

REDO LOG 200

| BLOCK ADDRESS | TIMESTAMP |
|---|---|
| 1 | 1 |
| 2 | 2 |
| 1 | 3 |
| 5 | 5 |
| 2 | 6 |
| 4 | 8 |
| 3 | 9 |
| 1 | 10 |

DISTRIBUTED DATABASE RECOVERY

FIELD OF THE INVENTION

The present invention relates to databases, and in particular, to perform database recovery using multiple database server instances.

BACKGROUND

A "cluster" is made up of multiple "nodes," each of which executes one or more database server instances that read data from and write data to a database that is located on shared storage. Each node may be a separate computing device. Nodes may communicate with other nodes and the shared storage through a network and/or other communication mechanisms.

Clusters offer many benefits not available in alternative data processing configurations. The computational power offered by a cluster of relatively inexpensive nodes often rivals the computational power offered by a single, much more expensive, computing device. Individual nodes can be added to or removed from a cluster according to need. Thus, clusters are highly scalable. Even when one node in a cluster fails, other nodes in the cluster may continue to provide services. Thus, clusters are highly fault-tolerant.

As mentioned above, each node in a cluster may execute one or more database server instances, referred to herein simply as "instances." Each such instance may have a separate buffer cache stored in the memory of the node on which that instance is resident. When a particular instance needs to access a block of data (referred to hereinafter as a "block") from the database, the instance determines whether the block is stored in any instance's buffer cache. If the block is stored in some instance's buffer cache, then the particular instance obtains the block from that buffer cache and places the block in the particular instance's buffer cache, unless the block is already stored in the particular instance's buffer cache. If the block is not stored in any instance's buffer cache, then the particular instance reads the block from the database and places the block in the particular instance's buffer cache. Either way, the particular instance can then access the block from the particular instance's buffer cache instead of the database. Accessing a block from a buffer cache is significantly faster than accessing a block from the database.

A block's size is typically fixed, e.g., 8 KB. The size of a block may be based on the properties of the disk on which data is stored and/or the mechanism that is used to read and write data to the disk.

When an instance accesses a block, the instance may do so for the purpose of modifying the block. The instance modifies the block that is in the instance's buffer cache. In order to reduce the amount of writing to the database, which degrades performance, the writing of the modified block to the database might be deferred for some period of time. To protect against node failure, a "redo log" stored in the database maintains a history of modifications that the instance performs on blocks. A single redo record typically contains information that pertains to a modification to one or more blocks. A single redo record is typically one or two orders of magnitude smaller than a single block. Because redo records are much smaller in size relative to the corresponding blocks, writing a redo record to a redo log in persistent storage is much faster than writing a block to persistent storage.

After a period of time, one or more modified blocks are written to the database. The point at which one or more modified blocks are written to the database is known as a "checkpoint." Any redo records in the redo log that precede a checkpoint may be ignored because the checkpoint indicates that the blocks stored in the database are "current" at the time of the checkpoint. In other words, the blocks stored in the database reflect the changes indicated in the redo records that were recorded in the redo log before the checkpoint.

Sometimes nodes fail. When a node fails, the blocks stored in the buffer caches resident on that node may be lost. Some of those lost blocks might be blocks that were modified but not yet written to the database. In such a situation, a recovery process needs to be initiated so that the database contains the correct blocks. One recovery process is described in U.S. patent application Ser. No. 10/891,433, filed on Jul. 13, 2004, entitled, "Performance Metric-Based Selection of One or More Database Server Instances to Perform Database Recovery."

Currently, a single surviving (referred to as the "recovery instance") instance performs database recovery. The recovering instance must read the redo log of the crashed instance. If there is more than one crashed instance, then the recovering instance must read the redo log of each crashed instance and sort the redo records according to when the corresponding changes were committed. This process may take a considerable amount of time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In order to perform a more efficient recovery of a database, according to one embodiment of the invention, multiple instances from multiple nodes in a cluster are selected for performing the recovery. The recovery is divided among multiple, e.g., all, surviving instances. The division of recovery may be based on the mastership of the blocks indicated in the redo records that were generated by the failed instances. Thus, each surviving instance reads and applies the redo records for the blocks over which it has mastership and skips all other redo records.

Although the present description refers to a block as the object that a database server instance modifies, embodiments of the invention are not limited to blocks. Embodiments of the invention may also include resources that correspond to logical data items, such as a row of a table. In other words, a database server instance may modify and manage data at the level of a resource. A resource may be stored entirely within a block or may span multiple blocks.

Example Cluster

Figure 1:
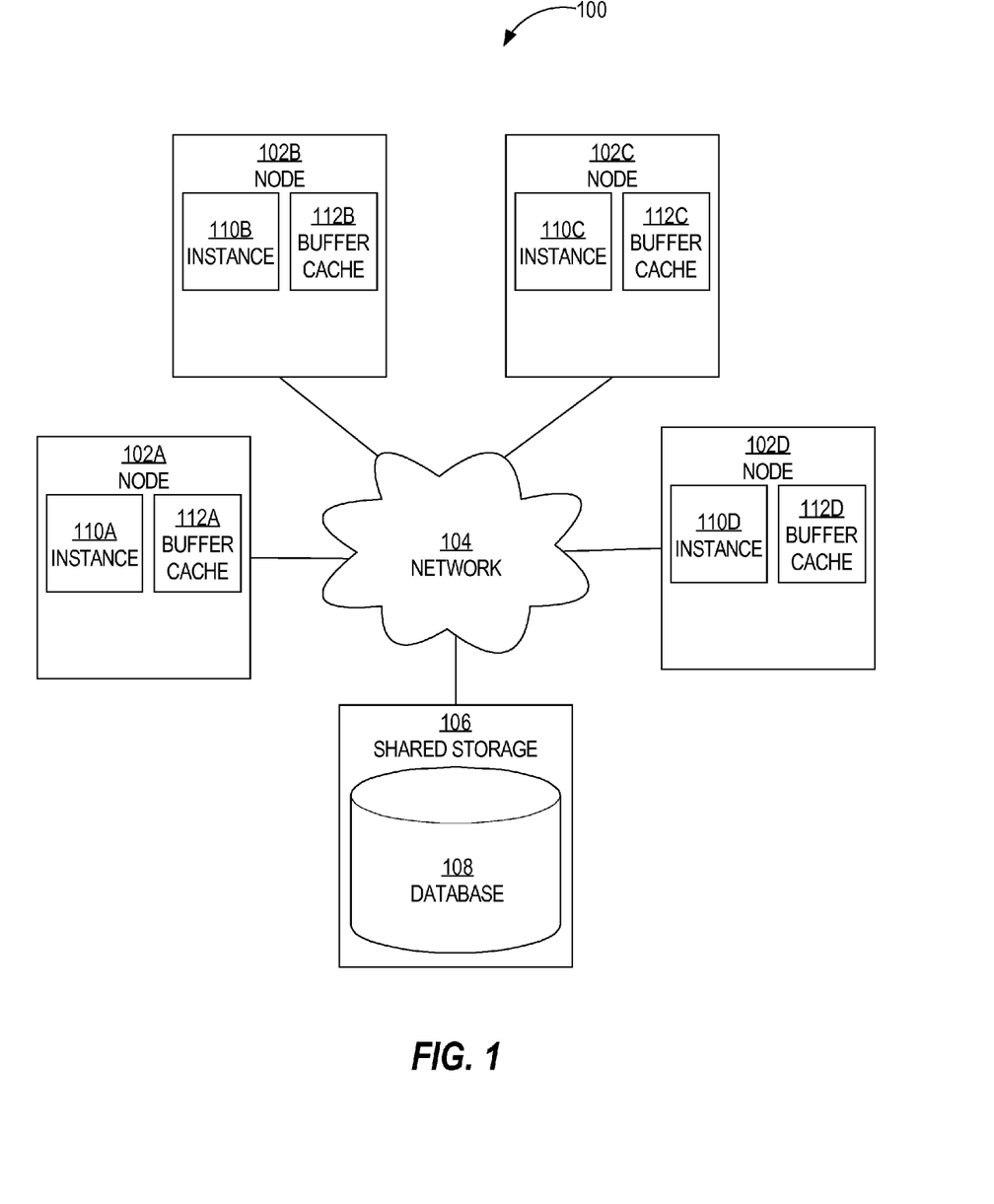
FIG. 1 is a block diagram that depicts an example cluster system, according to an embodiment of the invention.

FIG. 1 is a block diagram that depicts an example cluster system 100, according to an embodiment of the present invention, in which multiple instances perform database recovery. System 100 comprises nodes 102A, 102B, 102C, and 102D. Each of nodes 102A-D has one or more processors. Each of nodes 102A-D is coupled communicatively with a network 104. Network 104 may be, for example, a local area network (LAN) or a wide area network (WAN). System 100 also comprises a shared storage 106, which is also coupled communicatively with network 104. Thus, through network 104, nodes 102A-D can access each other and shared storage 106.

Shared storage 106 may be, for example, a persistent storage mechanism such as a hard disk drive. Shared storage 106 contains a database 108. Database 108 comprises one or more blocks. These blocks collectively contain database objects such as database tables. Each block may occupy a specified amount of storage space on shared storage 106.

Each of nodes 102A-D runs one or more database server instances. For example, an instance 110A is resident on node 102A, an instance 110B is resident on node 102B, an instance 110C is resident on node 102C, and an instance 110D is resident on node 102D. Each of instances 110A-D comprises one or more processors. Each of instances 110A-D is designed to access data stored in database 108.

Each of instances 110A-D uses and is associated with a buffer cache that may be stored in the memory of the node on which that instance resides. For example, instance 110A uses a buffer cache 112A, instance 110B uses a buffer cache 112B, instance 110C uses a buffer cache 112C, and instance 110D uses a buffer cache 112D. Each of buffer caches 112A-D comprises a plurality of buffer cache resources. Each such buffer cache resource may be the memory storage size of a single block of database 108. Thus, each buffer cache resource may be able to store one block. A buffer cache resource is considered to be "free" if that buffer cache resource does not currently contain a block. The number of buffer cache resources in a particular buffer cache may be user-specified, and may be limited by the memory resources of the node on which the buffer cache resides.

Each of instances 110A-D uses and is associated with a separate redo log that may be stored in shared storage 106 or in other persistent storage (not depicted). Each of instances 110A-D processes transactions. Before an instance allows a transaction to commit, the instance causes a redo record to be created and stored in the instance's redo log. A redo log allows an instance to commit a transaction without having to wait for a block (that is modified by a transaction) to be saved to database 108.

Checkpoints

In a typical scenario, a set of modified blocks are periodically written to a database. As described above, the point at which a set of modified blocks are written to the database is known as a "checkpoint." After a checkpoint, any redo records in the redo log that preceded that checkpoint may be deleted. However, a redo log may include one or more redo records that preceded one or more checkpoints. After a node failure, any redo records in the redo log that precede a checkpoint may be ignored because the checkpoint indicates that all blocks indicated by redo records that were recorded in the redo log (i.e., before the checkpoint) have already been written to disk. Therefore, subsequent references herein to "redo log" or "redo records" do not include any redo record that precedes a checkpoint.

Dividing Recovery

There are multiple ways in which the redo logs of failed instances may be divided among a plurality of surviving instances. For example, one or more redo logs may be divided among two or more surviving instances based on an assignment of a set of blocks indicated in the redo logs to the surviving instances. The block-to-surviving instance assignment may be based on arbitrary criteria. For example, if there are three surviving instances in a cluster and the addresses of the blocks in a database range from address 1 to 900, then one surviving instance may be responsible for recovering (i.e., applying redo records corresponding to) blocks with addresses in the range of 1 to 300, another surviving instance may be responsible for recovering blocks with addresses in the range of 301 to 600, and another surviving instance may be responsible for recovering blocks with addresses in the range of 601 to 900.

Alternatively, the block-to-surviving instance may be based on an existing mastership assignment, which is described in more detail below.

Dividing Recovery Based on Mastership

An instance "masters" a block if the instance is responsible for processing (including the granting) of lock requests for the block. The instance that "masters" a block is referred to as a "master" with respect to that block. A master thus maintains a global view of a block regardless of which instance currently holds a lock on the block.

Each instance is associated with and maintains a locking manager unit that indicates which blocks (i.e., that the instance is mastering) are currently locked and which instances in the cluster holds those locks. The locking manager unit may also indicate, for each lock, the type of lock. The locking manager unit may also indicate historical information, such as which instances previously held one or more locks on a block (i.e., that the instance is mastering), as well as which lock requests are currently pending.

One example of a lock management system is described in U.S. Pat. No. 6,363,396, entitled "Object Hashing With Incremental Changes," and issued on Mar. 26, 2002, and is incorporated herein by reference for all purposes as if fully set forth herein.

After one or more node crashes (or becomes otherwise unavailable), the blocks that are mastered by the failed instance(s) are "remastered" to surviving instances. If database recovery is performed based on mastership, then the remastering of the blocks to the surviving instance is first performed. Remastering may or may not entail remastering blocks that are mastered by surviving nodes. Embodiments of the invention are not limited to any particular remastering technique.

Figure 2:
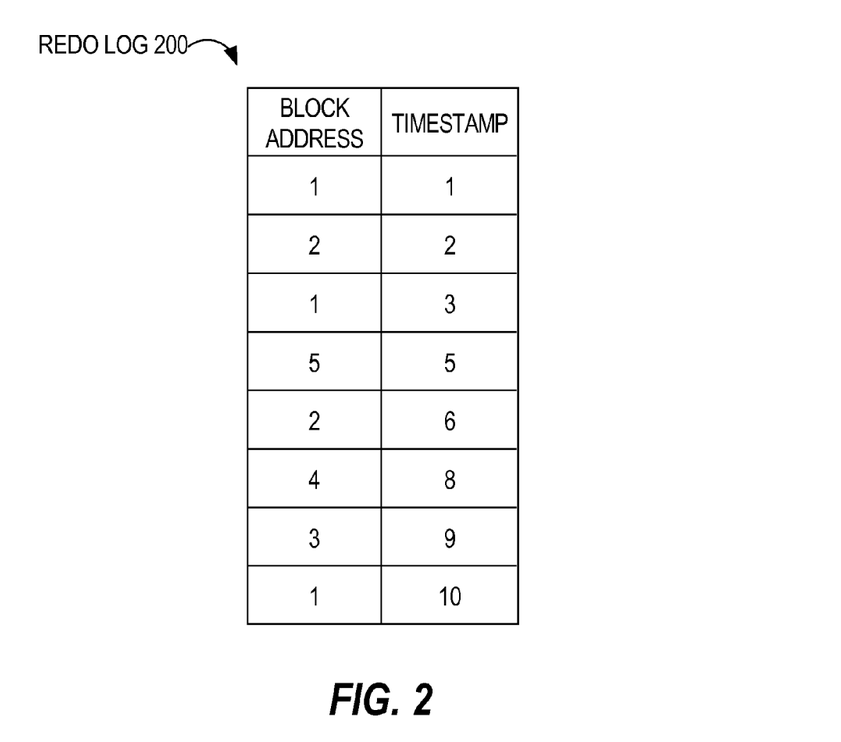
FIG. 2 is a block diagram that depicts an example redo log of a failed instance, according to an embodiment of the invention.

FIG. 2 is a block diagram that depicts an example redo log 200 of a failed instance, according to an embodiment of the invention. In this example, redo log 200 comprises eight redo records. Each redo record comprises (a) a block address of a block that is modified by a transaction and (b) a timestamp that indicates a time in which the corresponding transaction commits or in which the redo record was created. Redo log 200 comprises other information (not depicted), such as a new (or updated or deleted) value and a location within the corresponding block. In some database management systems, the timestamp is referred to as an "SCN" or sequence change number. The timestamp may or may not be based on actual time. However, the timestamp ensures that certain changes occurred in a particular order relative to other changes. For example, the second change to the block at address 1 occurred before the change to the block at address 5.

Example Recovery Process

Figure 3A:
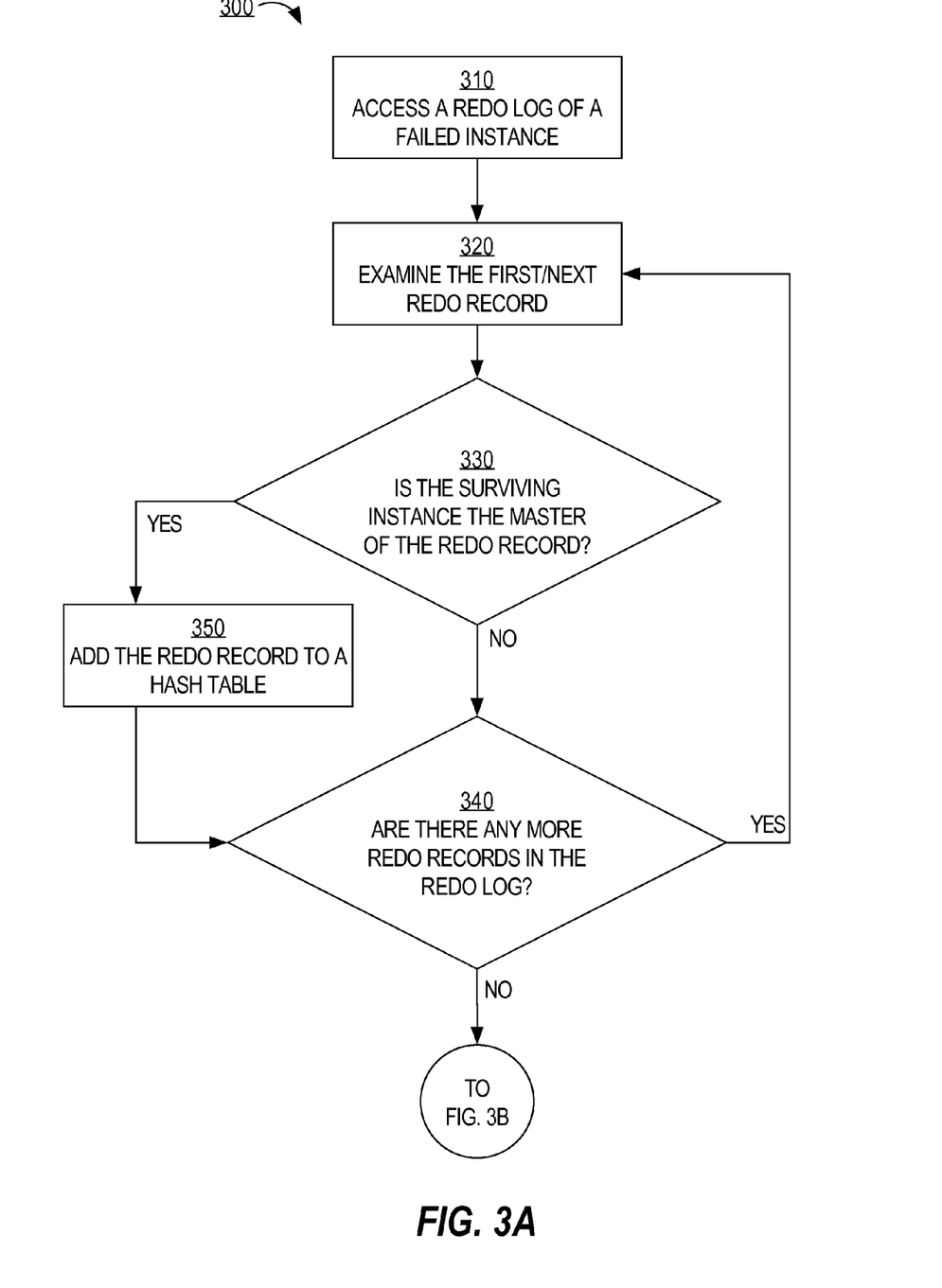
FIGS. 3A and 3B is a flow diagram that depicts a process for database recovery based on the mastership of blocks, according to an embodiment of the invention.
Figure 3B:
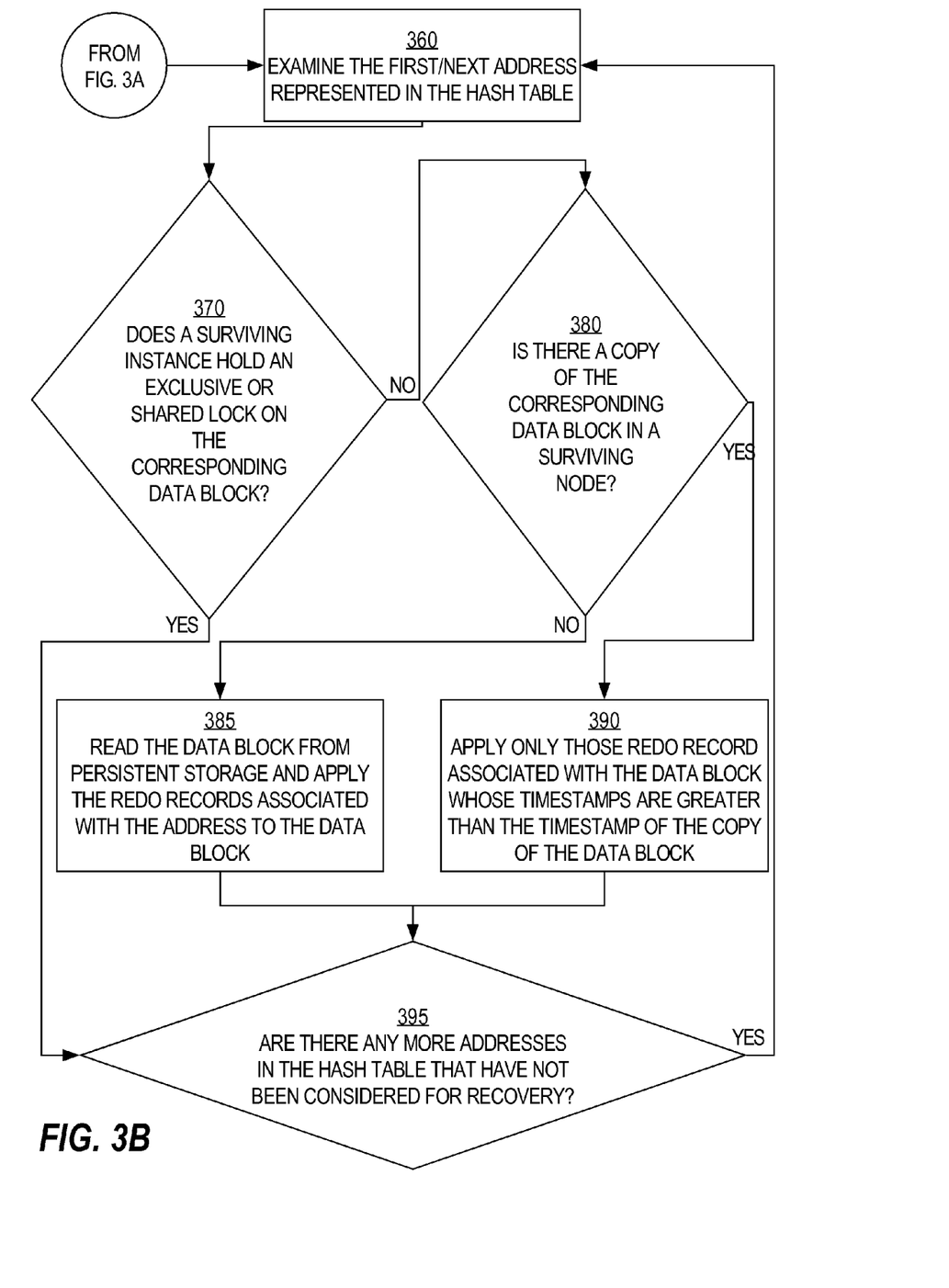

FIG. 3 is a flow diagram that depicts a process 300 for database recovery based on mastership, according to an embodiment of the invention. Each surviving instance performs the following steps. In the present example, the surviving instances are instances 110B-D and the failed instance is instance 110A. For ease of explanation, only instance 110B is referenced in the following steps. Each of instances 110C and 110D would also perform the following steps. Also, a single redo record may correspond to multiple blocks. However, for ease of explanation, a redo record corresponds to only a single block.

In step 310, instance 110B reads, from shared storage 106, redo log 200 of failed instance 110A. If there multiple failed instances, then the corresponding multiple redo logs are read from shared storage. In one embodiment, the multiple redo logs are combined and sorted chronologically. In an alternatively embodiment, described in more detail below, the multiple redo logs are not combined and sorted chronologically. Instead, a type of sorting is performed after a recovering instance (e.g., instance 110B) begins analyzing the multiple redo logs (e.g., after a negative determination in step 340 or as part of step 350).

In step 320, instance 110B examines the first redo record in the redo log. For example, instance 110B first examines the redo record in redo log 200, whose block address is 1 and whose timestamp is 1.

In step 330, instance 110B determines whether instance 110B is the master of the block indicated by the redo record. Instance 110B may determine this by examining a block-mastership mapping or by examining its locking manager unit. If instance 110B is not the master of the block that is indicated by the redo record, then the process proceeds to step 340. For example, instance 110B masters blocks at addresses 1 and 4, instance 110C masters blocks at addresses 2 and 5, and instance 110D masters blocks at address 5. When instance 110B examines the first redo record in redo log 200, instance 110B will determine that instance 110B is the master of the corresponding block (i.e., at block address 1). When instance 110B examines the second redo record in redo log 200, instance 110B will determine that instance 110B is not the master of the corresponding block (i.e., at block address 2).

In step 340, instance 110B determines whether there are any more redo records in the redo log to examine. If so, then process 300 returns to step 320 where instance 110B examines the next redo record in the redo log. For example, if instance 110B most recently examined the first redo record in redo log 200, then process 300 would return to step 320.

If, in step 340, instance 110B determines that there are no more redo records in the redo log to examine, then process 300 proceeds to step 360 in FIG. 3B. For example, if instance 110B most recently examined the last redo record in redo log 200, then process 300 would proceed to step 360.

If the result of the determination in step 330 is in the affirmative (i.e., instance 110B is the master of the block indicated by the redo record), then process 300 proceeds to step 350. For example, if instance 110B determined that instance 110B masters the block at address 1, then process 300 would proceed to step 350.

Hash Table

In step 350, instance 110B adds the redo record to a data structure that stores the redo records corresponding to blocks mastered by instance 110B. The data structure may be constructed as a part of the database recovery process. Alternatively, the data structure may be an existing data structure that instance 110B uses for concurrency control, such as a locking manager unit. For ease of explanation, this data structure is a hash table that is based on a hash of an address of a block. If multiple redo records correspond to the same block, then multiple redo records will be added to a particular entry in the hash table during database recovery (e.g., during step 350). Such redo records may be organized and maintained in multiple ways in association with the particular entry in the hash table, such as in a vector, an array, or a linked list.

After performance of step 350, process 300 proceeds to step 340, described above. After instance 110B examines all redo records in the redo log, process 300 proceeds to step 360 in FIG. 3B where instance 110B examines the hash table.

Figure 4:
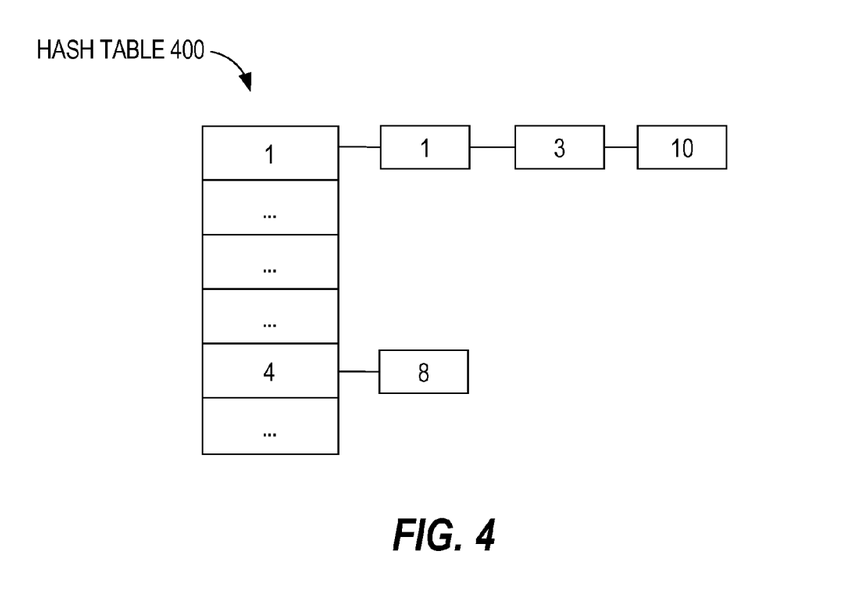
FIG. 4 depicts an example hash table that is populated with redo records that have been read from a redo log, according to an embodiment of the invention.

FIG. 4 depicts an example hash table 400, according to an embodiment of the invention. In this example, hash table 400 is used by instance 110B to track which redo records in redo log 200 are mastered by instance 110B. After examining each redo record in redo log 200, hash table 400 is associated with four redo records from redo log 200, i.e., the first, third, sixth, and eighth redo records. In the depicted example, hash table 400 merely depicts a block address and, for each redo record examined in redo log 200, a timestamp value.

In step 360, instance 110B examines an entry in the hash table. For example, instance 110B examines the first entry in hash table 400, which corresponds to block address 1. Each entry in a hash table may or may not be associated with any redo records. In the depicted example, hash table 400 includes at least 3 entries that are not associated with any redo records.

Locks and Blocks

In step 370, instance 110B determines whether a surviving instance currently holds an exclusive or shared lock on the block that corresponds to the entry examined in step 360. If a surviving instance currently has an exclusive lock on the block, then no more analysis is required of the redo records associated with the block. A surviving instance that holds an exclusive on a block always has the most current version of the block, i.e., a version that reflects all the changes indicated in the redo records. Even if a surviving instance currently has a shard lock on the block, the surviving instance may not have a copy of the block. A request is then sent to the surviving instance with the most recent copy of the block. Step 370 may be performed by examining an entry in instance 110B's locking manager unit.

If instance 110B determines that a surviving instance currently holds an exclusive or shared lock on the block, then process 300 proceeds to step 395. If instance 110B determines that a surviving instance does not currently hold an exclusive or shared lock on the block, then process 300 proceeds to step 380.

Looking for Blocks in Surviving Instances

In step 380, instance 110B determines whether a copy of the block that corresponds to the entry examined in step 360 is stored in one of the surviving nodes. Because instance 110B masters the block at address 1, instance 110B knows whether such a copy exists and, if so, where such a copy is stored. Step 370 may be performed by examining an entry in instance 110B's locking manager unit that indicates whether a copy of the block is stored on a surviving node.

If the determination in step 380 is negative, then process 300 proceeds to step 385. If the determination in step 380 is positive, then process 300 proceeds to step 390.

There may be circumstances in which instance 110B is responsible for recovering a block that instance 110B did not master before the crash or failure. For example, before failure of node 102A, instance 110A mastered a block at address 21. After the failure of node 102A, the block at address 21 is remastered to instance 110B. During the remastering of the block at address 21 to instance 110B, all surviving instances send, to instance 110B, all their corresponding lock and block information. If instance 110B determines from the lock and block information that a surviving node stores a copy of the block, then instance 110B may send a request to the corresponding surviving instance to request that copy.

Sorting Redo Records

If (a) the current node failure is a multiple-instance failure that requires instance 110B to read multiple redo logs, and (b) instance 110B did not combine and sort the redo records of the multiple redo logs chronologically, then step 360 (or another step, depicted or not depicted) may comprise a sorting step. A sorting step may be required in such a situation because the redo records added to a hash table during step 350 will probably not be in chronological order. Thus, in order to apply the redo records associated with a block in proper chronological order, the redo records must first be sorted. For each block, instance 110B may sort the redo records associated with that block after a negative determination in step 340. Alternatively, instance 110B may add redo records into the proper chronological order during step 350.

Applying the Redo Records

In step 385, instance 110B reads the block from persistent storage (e.g., database 108) and applies the one or more redo records (i.e., associated with the entry examined in step 360) to the block read from persistent storage. Process 385 proceeds to step 395. For example, if no surviving instance stores a copy of the block at address 1, then instance 110B applies each of the three redo records (indicated in FIG. 4) associated with block address 1 to a read-in-copy of the block at address 1.

In step 390, instance 110B applies only those redo records (i.e., associated with the entry examined in step 360) to the copy of the block (i.e., in one of the surviving instances) whose timestamps are greater (i.e., indicating later in time) than the timestamp of the copy of the block. In other words, only those redo records that are more "current" than the copy of the block are applied to the copy of the block. Redo records that indicate changes that are already reflected in the copy of the block do not need to be applied to the copy again.

If the copy of the block is in another surviving instance (e.g., instance 110C or 110D), then step 390 may entail instance 110B requesting and receiving that copy from the other surviving instance.

For example, instance 110B may determine that instance 110C (i.e., a surviving instance) has a copy of the block at address 1 and the copy has a timestamp of 5. Instance 110B requests that copy from instance 110C. Because 5 is greater than the timestamps associated with two of the redo records associated with the block at address 1, instance 110B applies only the most current redo record (i.e., associated with timestamp 10) of the three redo records.

In a related example, instance 110B may determine that instance 110C (i.e., a surviving instance) has a copy of the block at address 1 and the copy has a timestamp of 11. Because 11 is greater than the largest timestamp associated with the block at address 1 (i.e., 10), instance 110B does not apply any of the three redo records associated with the block at address 1 because the copy of the block reflects all the changes indicated in the three redo records.

If there are multiple copies of the block on multiple surviving instances, then, if necessary, instance 110B requests the copy of the block that is associated with the highest (i.e., latest in time) timestamp.

Alternative Process

As the above description demonstrates, process 300 is merely one possible process among many in which a cluster database may be recovered. Embodiments of the invention are not limited to the particular order in which the steps of process 300 are depicted in FIG. 3 and described above, nor to the exact steps. As another example, steps 370-390 may be performed upon a positive determination in step 330 instead of being performed after a negative determination in step 340. In such a scenario, steps 360 and 395 are not performed. Also in such a scenario, steps 370 and 380 may be performed multiple times if there are multiple redo records in the redo log that are for the same block.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
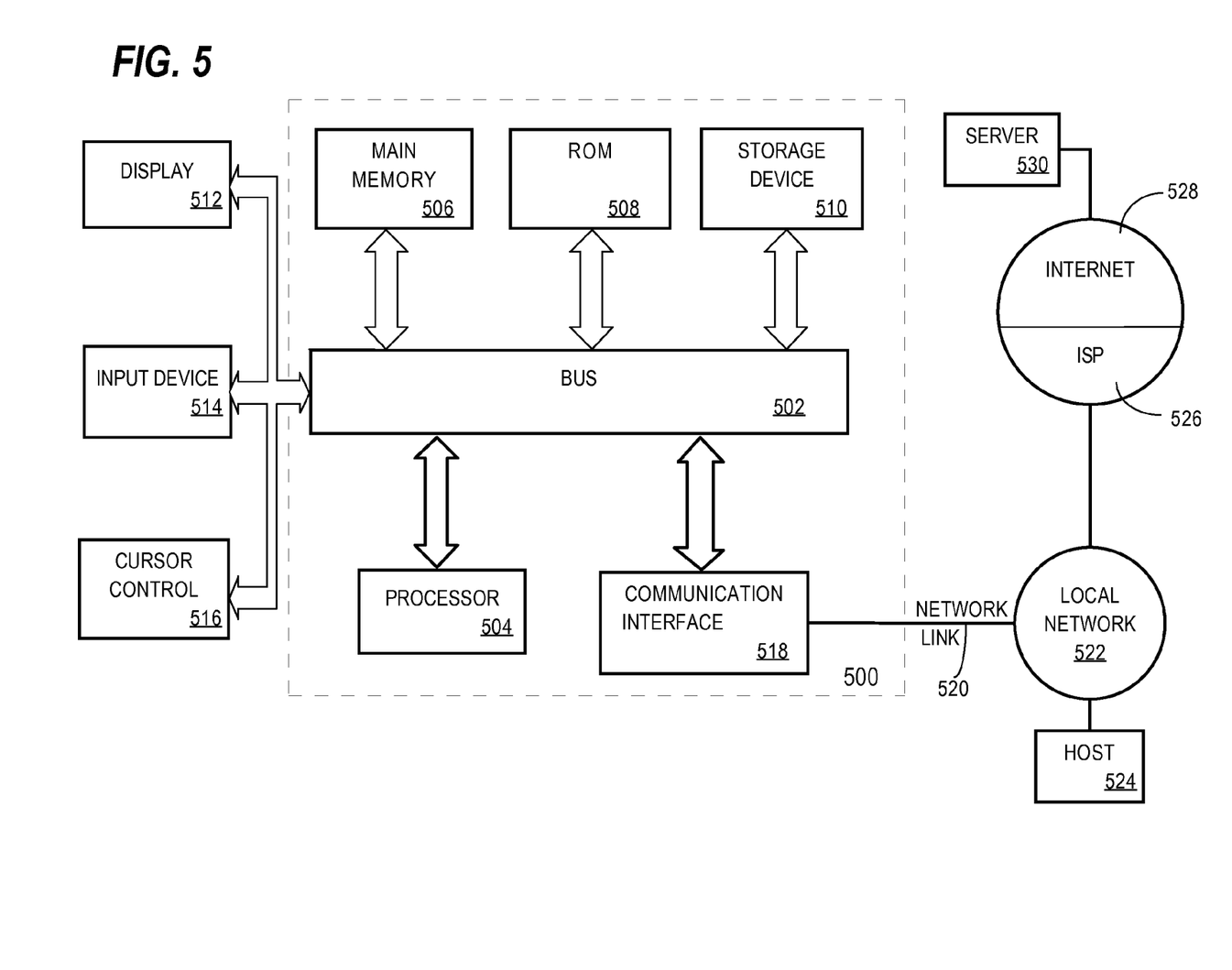
FIG. 5 is a block diagram that depicts a computer system upon which an embodiment of the invention may be implemented.

For example, FIG. 5 is a block diagram that depicts a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    determining that a set of one or more nodes in a plurality of nodes, in a cluster database system, are not available;
    wherein each node of the plurality of nodes hosts at least one database server instance;
    wherein each database server instance in the cluster database system maintains a separate redo log in shared storage that is accessible by each other database server instance in the cluster database system; and
    each surviving instance of a plurality of database server instances that are hosted by nodes, in the cluster database system, that are available:
        identifying, based on mastership of resources that are indicated in a set of one or more redo logs that were updated by one or more database server instances that were hosted by the set of one or more nodes, a subset of the resources,
        for each resource in the subset:
            determining whether a copy of said each resource is stored in any node, of the plurality of nodes, that is available,
            if a copy of said each resource is not stored in a node, of the plurality of nodes, that is available, then causing said each resource to be read from persistent storage and applying one or more redo records indicated in one or more of the set of one or more redo logs to said each resource,
            if a copy of said each resource is stored in a node, of the plurality of nodes, that is available, then:
                identifying a set of one or more redo records that are associated with said each resource and that are associated with timestamps that are greater than a timestamp of the copy of said each resource, and
                applying each redo record in the set of one or more redo records to said copy of said each resource;
    wherein the method is performed by one or more computing devices.

2. The method of claim 1, wherein applying comprises said each surviving instance applying only redo records, in the set of one or more redo logs, that are associated with resources that are mastered by said each surviving instance.

3. The method of claim 1, further comprising, before said each surviving instance identifying said subset of the resources, remastering, among the plurality of surviving instances, resources that were mastered by the one or more database server instances that were hosted by the set of one or more nodes that are not available, wherein one or more of the resources are indicated in the set of one or more redo logs.

4. The method of claim 1, further comprising:
    said each surviving instance, for said each resource in the subset, determining whether any surviving instance holds a lock on said each resource;
    wherein determining whether a copy of said each resource is stored in one of the nodes, of the plurality of nodes, that are available is performed in response to determining that none of the surviving instances holds a lock on said each resource.

5. The method of claim 1, wherein the resources are data blocks.

6. The method of claim 1, wherein:
    applying comprises applying a plurality of redo records that are associated with a particular resource; and
    the method further comprises, prior to applying the plurality of redo records to the particular resource, sorting the plurality of redo records based on when changes that correspond to the plurality of redo records were committed.

7. A method comprising:
    determining that a set of one or more nodes, in a plurality of nodes in a cluster database system, are not available;
    wherein each node of the plurality of nodes hosts at least one database server instance;
    wherein each database server instance in the cluster database system maintains a separate redo log in shared storage that is accessible by each other database server instance in the cluster database system;
    in response to determining that the set of one or more unavailable-nodes are not available, dividing a set of resources among a plurality of surviving instances, wherein each surviving instance of the plurality of surviving instances is a database server instance that is hosted by a node, in the cluster database system, that is available;
    wherein the set of resources includes resources that are indicated in one or more redo logs that are associated with one or more failed instances;
    wherein each of the one or more failed instances is a database server instance that was hosted by a node in the set of one or more nodes that is unavailable;
    wherein each surviving instance of the plurality of surviving instances is assigned a subset of the set of resources that is different relative to the subset of the set of resources that is assigned to each other surviving instance in the plurality of surviving instances; and
    each surviving instance of the plurality of surviving instances performing recovery only of the subset of resources that are assigned to said each surviving instance;
    wherein each surviving instance performing recovery comprises, for each resource in the subset of resources that are assigned to said each surviving instance, said each surviving instance:
        determining whether any surviving instance holds a lock on said each resource,
        if it is determined that none of the surviving instances holds a lock on said each resource, then determining whether a copy of said each resource is stored in any node, of the plurality of nodes, that is available,
        if it is determined that a copy of said each resource is stored in a node, of the plurality of nodes, that is available, then applying, to said each resource one or more redo records from one or more of the one or more redo logs;
    wherein the method is performed by one or more computing devices.

8. The method of claim 7, wherein performing recovery comprises:
    if it is determined that a copy of said each resource is stored in a node, of the plurality of nodes, that is available, then retrieving a copy of said each resource from persistent storage that is accessible to each surviving instance of the plurality of database server instances and applying one or more record records from one or more of the one or more redo logs.

9. The method of claim 7, wherein:
the one or more redo records are a plurality of redo records that are associated with a particular resource; and
the method further comprises, prior to applying the plurality of redo records to the particular resource, sorting the plurality of redo records based on when changes that correspond to the plurality of redo records were committed.

10. The method of claim 7, further comprising:
if said each surviving instance determines that another surviving instance holds a shared lock on said each resource, then said each surviving instance sending, to the other surviving instance, a request for a copy of said each resource.

11. One or more storage media storing instructions which, when executed by one or more processors, cause:
determining that a set of one or more nodes in a plurality of nodes, in a cluster database system, are not available;
wherein each node of the plurality of nodes hosts at least one database server instance;
wherein each database server instance in the cluster database system maintains a separate redo log in shared storage that is accessible by each other database server instance in the cluster database system; and
each surviving instance of a plurality of database server instances that are hosted by nodes, in the cluster database system, that are available:
identifying, based on mastership of resources that are indicated in a set of one or more redo logs that were updated by one or more database server instances that were hosted by the set of one or more nodes, a subset of the resources, and
for each resource in the subset:
determining whether a copy of said each resource is stored in any node, of the plurality of nodes, that is available,
if a copy of said each resource is not stored in a node, of the plurality of nodes, that is available, then causing said each resource to be read from persistent storage and applying one or more redo records indicated in one or more of the set of one or more redo logs to said each resource,
if a copy of said each resource is stored in a node, of the plurality of nodes, that is available, then:
identifying a set of one or more redo records that are associated with said each resource and that are associated with timestamps that are greater than a timestamp of the copy of said each resource, and
applying each redo record in the set of one or more redo records to said copy of said each resource.

12. The one or more storage media of claim 11, wherein applying comprises said each surviving instance applying only redo records, in the set of one or more redo logs, that are associated with resources that are mastered by said each surviving instance.

13. The one or more storage media of claim 11, wherein the instructions include instructions which, when executed by the one or more processors, further cause, before said each surviving instance identifying said subset of the resources, remastering, among the plurality of surviving instances, resources that were mastered by the one or more database server instances that were hosted by the set of one or more nodes that are not available, wherein one or more of the resources are indicated in the set of one or more redo logs.

14. The one or more storage media of claim 11, wherein the instructions, when executed by the one or more processors, further cause:
said each surviving instance, for said each resource in the subset, determining whether any surviving instance holds a lock on said each resource;
wherein determining whether a copy of said each resource is stored in one of the nodes, of the plurality of nodes, that are available is performed in response to determining that none of the surviving instances holds a lock on said each resource.

15. The one or more storage media of claim 11, wherein the resources are data blocks.

16. The one or more storage media of claim 11, wherein:
applying comprises applying a plurality of redo records that are associated with a particular resource; and
the instructions, when executed by the one or more processors, further comprises, prior to applying the plurality of redo records to the particular resource, sorting the plurality of redo records based on when changes that correspond to the plurality of redo records were committed.

17. One or more storage media storing instructions which, when executed by one or more processors, cause performance of:
determining that a set of one or more nodes, in a plurality of nodes in a cluster database system, are not available;
wherein each node of the plurality of nodes hosts at least one database server instance;
wherein each database server instance in the cluster database system maintains a separate redo log in shared storage that is accessible by each other database server instance in the cluster database system;
in response to determining that the set of one or more nodes are not available, dividing a set of resources among a plurality of surviving instances, wherein each surviving instance of the plurality of surviving instances is a database server instance that is hosted by a node, in the cluster database system, that is available;
wherein the set of resources includes resources that are indicated in one or more redo logs that are associated with one or more failed instances;
wherein each of the one or more failed instances is a database server instance that was hosted by a node in the set of one or more nodes that is unavailable;
wherein each surviving instance of the plurality of surviving instances is assigned a subset of the set of resources that is different relative to the subset of the set of resources that is assigned to each other surviving instance in the plurality of surviving instances; and
each surviving instance of the plurality of surviving instances performing recovery only of the subset of resources that are assigned to said each surviving instance;
wherein each surviving instance performing recovery comprises, for each resource in the subset of resources that are assigned to said each surviving instance, said each surviving instance:
determining whether any surviving instance holds a lock on said each resource,
if it is determined that none of the surviving instances holds a lock on said each resource, then determining whether a copy of said each resource is stored in any node, of the plurality of nodes, that is available,
if it is determined that a copy of said each resource is stored in a node, of the plurality of nodes, that is available, then applying, to said each resource one or more redo records from one or more of the one or more redo logs.

18. The one or more storage media of claim 17, wherein performing recovery comprises:
if it is determined that a copy of said each resource is stored in a node, of the plurality of nodes, that is available, then retrieving a copy of said each resource from persistent storage that is accessible to each surviving instance of the plurality of database server instances and applying one or more record records from one or more of the one or more redo logs.

19. The one or more storage media of claim 17, wherein:
applying comprising applying a plurality of redo records that are associated with a particular resource; and
the instructions, when executed by the one or more processors, further comprises, prior to applying the plurality of redo records to the particular resource, sorting the plurality of redo records based on when changes that correspond to the plurality of redo records were committed.

20. The one or more storage media of claim 17, wherein the instructions, when executed by one or more processors, further cause:
if said each surviving instance determines that another surviving instance holds a shared lock on said each resource, then said each surviving instance sending, to the other surviving instance, a request for a copy of said each resource.

* * * * *

UNITED STATES PATENT AND TRADEMARK OFFICE
CERTIFICATE OF CORRECTION

PATENT NO.         : 8,429,134 B2
APPLICATION NO.    : 12/555500
DATED              : April 23, 2013
INVENTOR(S)        : Chan Page 1 of 1

It is certified that error appears in the above-identified patent and that said Letters Patent is hereby corrected as shown below:

In the Specification:

In column 6, line 58, delete "Locks and Blocks" and insert -- Locks on Blocks --, therefor.

In the Claims:

In column 12, line 24, in Claim 7, delete "unavailable-nodes" and insert -- nodes --, therefor.

In column 12, line 57, in Claim 7, delete "resource" and insert -- resource, --, therefor.

In column 13, line 2, in Claim 8, delete "record records" and insert -- redo records --, therefor.

In column 15, line 1, in Claim 17, delete "resource" and insert -- resource, --, therefor.

In column 15, line 11, in Claim 18, delete "record records" and insert -- redo records --, therefor.

Signed and Sealed this
Sixth Day of August, 2013

Teresa Stanek Rea
*Acting Director of the United States Patent and Trademark Office*